United States Patent
Logan (10) Patent No.: US 8,250,267 B2
(45) Date of Patent: Aug. 21, 2012

(54) CONTROL I/O OFFLOAD IN A SPLIT-PATH STORAGE VIRTUALIZATION SYSTEM

(75) Inventor: John Gifford Logan, Long Beach, CA (US)

(73) Assignee: Netapp, Inc., Sunnyvale, CA (US)

( * ) Notice: Subject to any disclaimer, the term of this patent is extended or adjusted under 35 U.S.C. 154(b) by 844 days.

(21) Appl. No.: 12/262,248

(22) Filed: Oct. 31, 2008

(65) Prior Publication Data

US 2010/0115208 A1     May 6, 2010

(51) Int. Cl.
G06F 3/00      (2006.01)
G06F 13/28     (2006.01)
G06F 13/00     (2006.01)
G06F 13/12     (2006.01)
G06F 15/177    (2006.01)
G06F 15/16     (2006.01)
H04L 12/56     (2006.01)
H04L 12/28     (2006.01)
H04J 3/24      (2006.01)

(52) U.S. Cl. .......... 710/74; 710/5; 710/20; 710/22; 710/33; 709/220; 709/250; 370/392; 370/395.52; 370/401; 370/474

(58) Field of Classification Search .......... None
See application file for complete search history.

(56) References Cited

U.S. PATENT DOCUMENTS

| | | | | |
|---|---|---|---|---|
| 4,246,637 A * | 1/1981 | Brown et al. | ..... | 710/62 |
| 6,952,743 B2 * | 10/2005 | Ortega et al. | ..... | 710/5 |
| 7,475,167 B2 * | 1/2009 | Wunderlich et al. | ..... | 710/33 |
| 7,548,997 B2 * | 6/2009 | Go et al. | ..... | 710/22 |
| 7,620,747 B1 * | 11/2009 | Overby et al. | ..... | 710/22 |
| 7,738,469 B1 * | 6/2010 | Shekokar et al. | ..... | 370/401 |
| 7,864,806 B2 * | 1/2011 | Qiu et al. | ..... | 370/474 |
| 7,865,624 B1 * | 1/2011 | Hendel et al. | ..... | 709/250 |
| 7,889,734 B1 * | 2/2011 | Hendel et al. | ..... | 370/392 |
| 7,924,848 B2 * | 4/2011 | Biran et al. | ..... | 370/395.52 |
| 7,996,569 B2 * | 8/2011 | Aloni et al. | ..... | 709/250 |
| 2003/0140124 A1 * | 7/2003 | Burns | ..... | 709/220 |
| 2005/0232285 A1 * | 10/2005 | Terrell et al. | ..... | 370/401 |
| 2006/0106808 A1 | 5/2006 | Kalos et al. | | |

OTHER PUBLICATIONS

"6WINDGate™ Fast Path Modules (6WINDGate™ SDS)." 6Wind. Jul. 4, 2008. <http://web.archive.org/web/20080704110937/http://www.6wind.com/6WINDGate-software/6WINDGate-software/SDS_Fast_Path_Modules>. Accessed May 3, 2012.*

* cited by examiner

Primary Examiner — Chun-Kuan Lee
Assistant Examiner — Henry Yu
(74) Attorney, Agent, or Firm — Haynes and Boone, LLP (57) ABSTRACT

Various embodiments of systems, methods, computer systems and computer software are disclosed for implementing a control I/O offload feature in a split-path storage virtualization system. One embodiment is a method for providing split-path storage services to a plurality of hosts via a storage area network.

16 Claims, 6 Drawing Sheets

CONTROL I/O OFFLOAD IN A SPLIT-PATH STORAGE VIRTUALIZATION SYSTEM

BACKGROUND

The invention generally relates to storage virtualization and, more particularly, to split-path storage virtualization systems.

A storage area network (SAN) is a specialized, high-speed computer network that is typically used to attach computer systems or servers (commonly referred to as "hosts") to back-end storage devices. The primary purpose of the SAN is to transfer data between the hosts and the storage devices. A SAN typically comprises a communication infrastructure that provides physical connections and a management layer that organizes the connections, storage elements, and computer systems, so that data transfer is secure and robust. SANs are typically, although not necessarily, identified with block input/output (I/O) services.

SANs eliminate the traditional dedicated connection between servers and storage elements, as well as any restrictions to the amount of data that a server may access. Instead, a SAN provides the flexibility of networking to enable one server or many heterogeneous servers to share a common storage utility, which may comprise many storage devices, such as, for example, disk, tape, optical, or other storage devices or systems.

The management layer typically comprises a storage services platform that provides storage virtualization to the hosts. Virtualization refers to the abstraction of storage in which representation of a storage unit to the operating system or applications on the host is separated from the actual physical storage on which the information is contained. One common approach to storage virtualization is a split-path architecture in which the responsibilities of data transfer between the host and a storage device (e.g., read or write operations) and control operations are "split". In a split-path architecture, the data path is typically implemented in high-speed hardware and, therefore, is commonly referred to as a fastpath. The fastpath handles all block READ and WRITE I/O or other data operations at wire speed, while the control path hardware manages control I/O operation. The control path is typically implemented with separate hardware than the fastpath, although the fastpath and the control path hardware interface with each other and may share memory. In operation, control I/O commands from hosts are received by the fastpath and then forwarded to the control path (which may be internal or external to the storage services platform) for appropriate responses based on the state of the logical volume maintained by the platform.

Despite the many advantages and the commercial success of split-path architectures, there remains a need in the art for ways to improve the overall control I/O performance in situations where the aggregate control I/O load provided to the split-path storage services platform may reduce control I/O performance.

SUMMARY

Various embodiments of systems, methods, computer systems and computer software are disclosed for implementing a control I/O offload feature in a split-path storage virtualization system. One embodiment is a computer system for providing split-path storage services. One such computer system comprises: a fastpath processor adapted to communicate with a plurality of hosts and a plurality of storage devices via a storage area network; a control path processor in communication with the fastpath processor; a shared memory accessible by the control path processor and the fastpath processor, the shared memory storing logical state information associated with the hosts and the storage devices and mapping information for determining whether commands received by the fastpath processor are to be handled by the fastpath processor or the control path processor; and a command offload module executable by the fastpath processor, the command offload module comprising logic configured to: receive a command from one of the hosts via the storage area network; retrieve logical state information associated with the command; based on the mapping information, determine whether the received command involves a read/write operation or an offloaded control I/O operation; if the received command involves a read/write operation, determining read/write mapping data based on the mapping information and issuing a read/write command to the corresponding storage device; and if the received command involves an offloaded control I/O operation, determining a response to the received command based on the mapping information and sending the response to the host.

Another embodiment is a method for providing split-path storage services to a plurality of hosts via a storage area network. One such method comprises: receiving a command from a host via a storage area network: retrieving logical state information associated with the received command; based on stored mapping information, determining whether the received command involves a read/write operation or an offloaded control I/O operation; if the received command involves a read/write operation, handling the read/write operation with a fastpath processor by determining read/write mapping data based on the mapping information and issuing a read/write command to the corresponding storage device; if the received command involves an offloaded control I/O operation, handling the offloaded control I/O operation with a fastpath processor by determining a response to the received command based on the mapping information and sending the response to the host; and if the received command does not involve a read/write operation or an offloaded control I/O operation, forwarding the received command to a control path processor.

Yet another embodiment is a computer program embodied in a computer-readable medium and executable by a processor for providing split-path storage services. One such computer program comprises logic configured to: receive a command from a host via a storage area network; retrieve logical state information associated with the received command; based on stored mapping information, determine whether the received command involves a read/write operation or an offloaded control I/O operation; if the received command involves a read/write operation, process the read/write operation with a fastpath processor by determining read/write mapping data based on the mapping information and issuing a read/write command to a corresponding storage device connected to the storage area network; if the received command involves an offloaded control I/O operation, process the offloaded control I/O operation with a fastpath processor by determining a response to the received command based on the mapping information and sending the response to the host; and if the received command does not involve a read/write operation or an offloaded control I/O operation, forward the received command to a control path processor.

DETAILED DESCRIPTION

Figure 1:
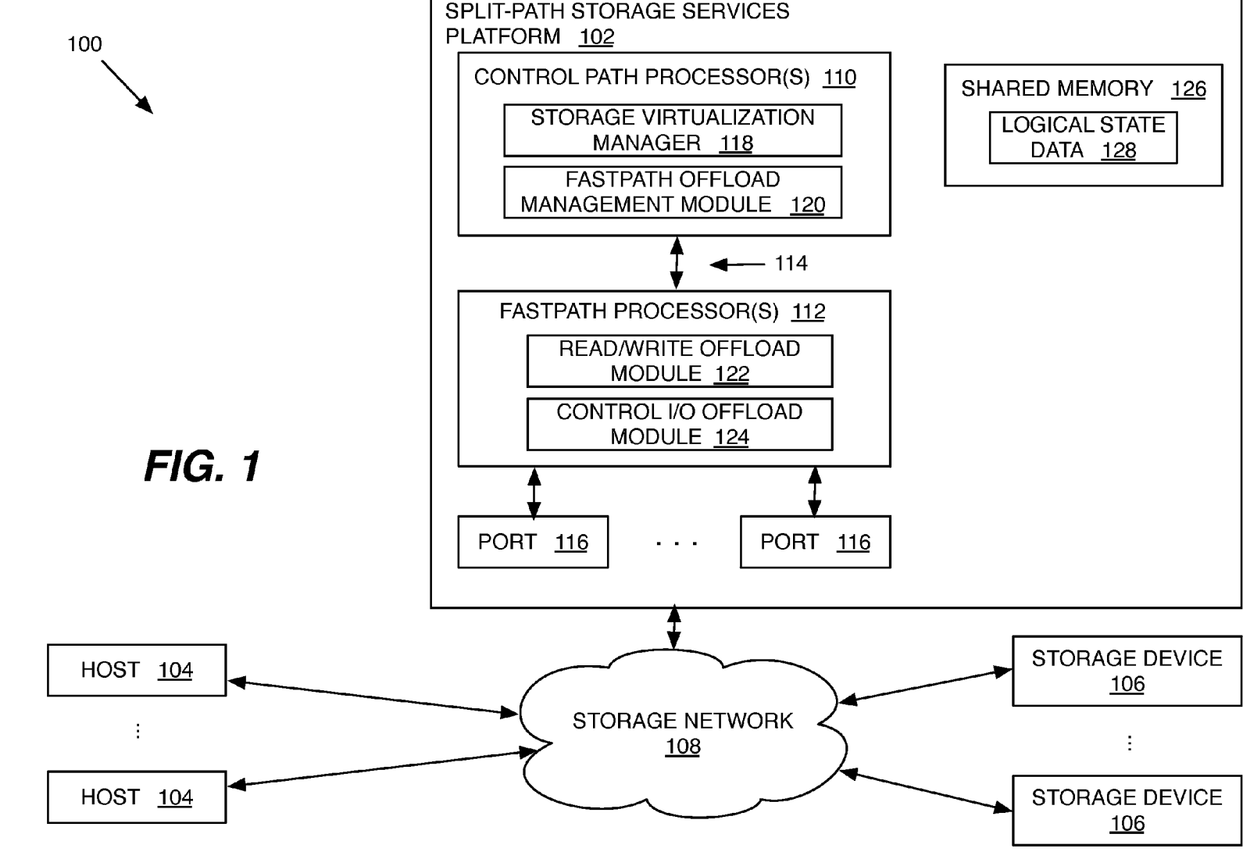
FIG. 1 is a block diagram illustrating an embodiment of a system for implementing a split-path storage services platform that supports the offload of control I/O operations from the control path processor(s) to the fastpath processor(s).

FIG. 1 illustrates a system 100 representing an exemplary working environment for implementing a split-path storage services platform 102. In general, the split-path storage services platform 102 provides data storage services to one or more hosts 104 via a storage area network 108. As known in the art, the split-path storage services platform 102 connects a host 104 to data stored on one or more storage devices 106. In this manner, the split-path storage services platform 102 provides what are referred to as storage services to the hosts 102. The storage devices 106 may comprise any suitable storage means, such as, for example, disk systems (e.g., Just a Bunch of Disks (JBOD), Redundant Array of Independent Disks (RAID), etc.), optical systems, or tape systems (e.g., tape drives, tape autoloaders, tape libraries). In an embodiment, the hosts 104 comprise one or more servers or other computer system(s) configured to interface with the storage area network 108.

The split-path storage services platform 102 manages the virtualization of the physical data storage on storage devices 106 and provides the requested data to the hosts 104 as a storage service. Storage virtualization is known in the art and generally refers to the process of abstracting logical storage from the physical storage in storage devices 108. Virtualization of storage helps achieve location independence by abstracting the physical location of the data. As described below in more detail, the split-path storage services platform 102 configures and manages the storage virtualization functions. In general, the split-path storage services platform 102 presents to the hosts 104 a logical space for data storage and handles the process of configuring, managing, and mapping the logical space to the physical storage. The form of the logical mapping may be implemented in any suitable manner and may support various known or future standards or protocols. In an embodiment, the storage virtualization may be implemented in a block-based storage environment, in which a block of information is addressed using a logical identifier.

In operation, the split-path storage services platform 102 receives commands from the hosts 104 via port(s) 116. In an embodiment, the port(s) 116 comprise fiber channel ports, although any network device may be used for communication via the storage area network 108. It should be appreciated that any suitable communication protocols may be implemented. Furthermore, in an embodiment, the split-path storage services platform 102 may support one or more of the Small Computer System Interface (SCSI) standards for physically connecting and transferring data between the hosts 104 and the storage devices 106. The split-path storage services platform 102 receives requests or commands from the hosts 104, including, for example, read/write commands and control I/O commands. In an embodiment, SCSI commands or requests are used. As known in the art, read/write commands involve requests to read and/or write data stored on one or more storage devices 106 and, therefore, involve the transfer of data stored on storage device(s) 106 to host(s) 104. Control I/O commands involve control operations such as, for example, a standard inquiry, read capacity inquiry, a test unit ready inquiry, etc. Such control operations typically do not involve data transfer from storage device(s) 106, but rather involve requests for information about the logical state of the data.

As illustrated in FIG. 1 and as the name suggests, the split-path storage services platform 102 generally implements a split-path architecture in which the responsibilities of data transfer (between hosts 104 and storage devices 106) and control I/O functions may be split between separate sets of one or more processors. Data transfer is provided via one or more fastpath processors 112, and the control functions are provided via one or more control path processor(s) 110. The fastpath processor(s) 112 and the control processor(s) 110 are connected via an interface 114 and may share a memory 126 that may comprise logical state data 128.

The control path processor(s) 110 may comprise a general purpose processor such as a server processor. In an embodiment, the fastpath processor(s) 112 may comprise embedded processors in a custom I/O processing ASIC or FPGA. In other embodiments, the fastpath processor(s) 112 may comprise embedded processors in a commodity-type network processor, discrete and separate general purpose processors (from control processor(s) 110), or dedicated processor cores on a multicore control processor.

The control path processor(s) 110 and the fastpath processor(s) 112 may be configured to execute one or more modules, logic, functionality, etc. (e.g., hardware, firmware, software, or any combination thereof) for selectively controlling whether particular types of control commands received from the hosts 104 are to be processed via the fastpath processor(s) 112 or the control path processor(s) 110. In other words, within the context of the split-path architecture, these specially-configured module(s) (i.e., command offload module(s)) enable control I/O operations to be selectively offloaded from the control path processor(s) 110 to the fastpath processor(s). In an embodiment, the split-path storage services platform 102 may be configured to enable the fastpath processor(s) 112 to process read/write operations and selectively process certain types of control operations that are to be offloaded from the control path processor(s) 110 to the fastpath processor(s) 112. As illustrated in FIG. 1, the control path processor(s) 110 may be configured to execute a fastpath offload management module 120 and the fastpath processor(s) 112 may be configured to execute one or more command offload module(s), such as, for example, a read/write offload module 122 and a control I/O offload module 124.

In general, the fastpath offload management module 120 may be configured to expose data to the fastpath processor(s) 112 via an interface 114 and/or a shared memory 126. One of ordinary skill in the art will appreciate that by exposing data about the logical space (e.g., logical state data 128) and/or the physical storage devices 106 the fastpath processor(s) 112 are able to process received commands rather than forward them to the control path processor(s) 110. In this regard, the commands or operations performed by the fastpath processor(s) 112 are "offloaded" from the control path processor(s) 110. The read/write module 122 comprises the logic or functionality for enabling the fastpath processor(s) 112 to identify that received commands involve a read/write operation, and the control I/O offload module 124 comprises the logic or functionality for enabling the fastpath processor(s) 112 to identify offloaded control operations. As described below in more detail, the modules 122 and 124 may be configured to access the data exposed by the fastpath offload management module 120 to determine how to respond to a particular command. In an embodiment, the modules 122 and 124 may be configured to perform a lookup operation in the shared memory 126. In the case of a read/write operation, the module 122 may determine the logical state information from the received command, perform a lookup to identify the corresponding physical storage information, and then issue an appropriate command to the identified storage device 106. In the case of a control I/O operation, the module 124 may determine a particular control I/O command, perform a lookup to determine the appropriate response to the command, and then send an appropriate response to the requesting host 104.

Figure 2:
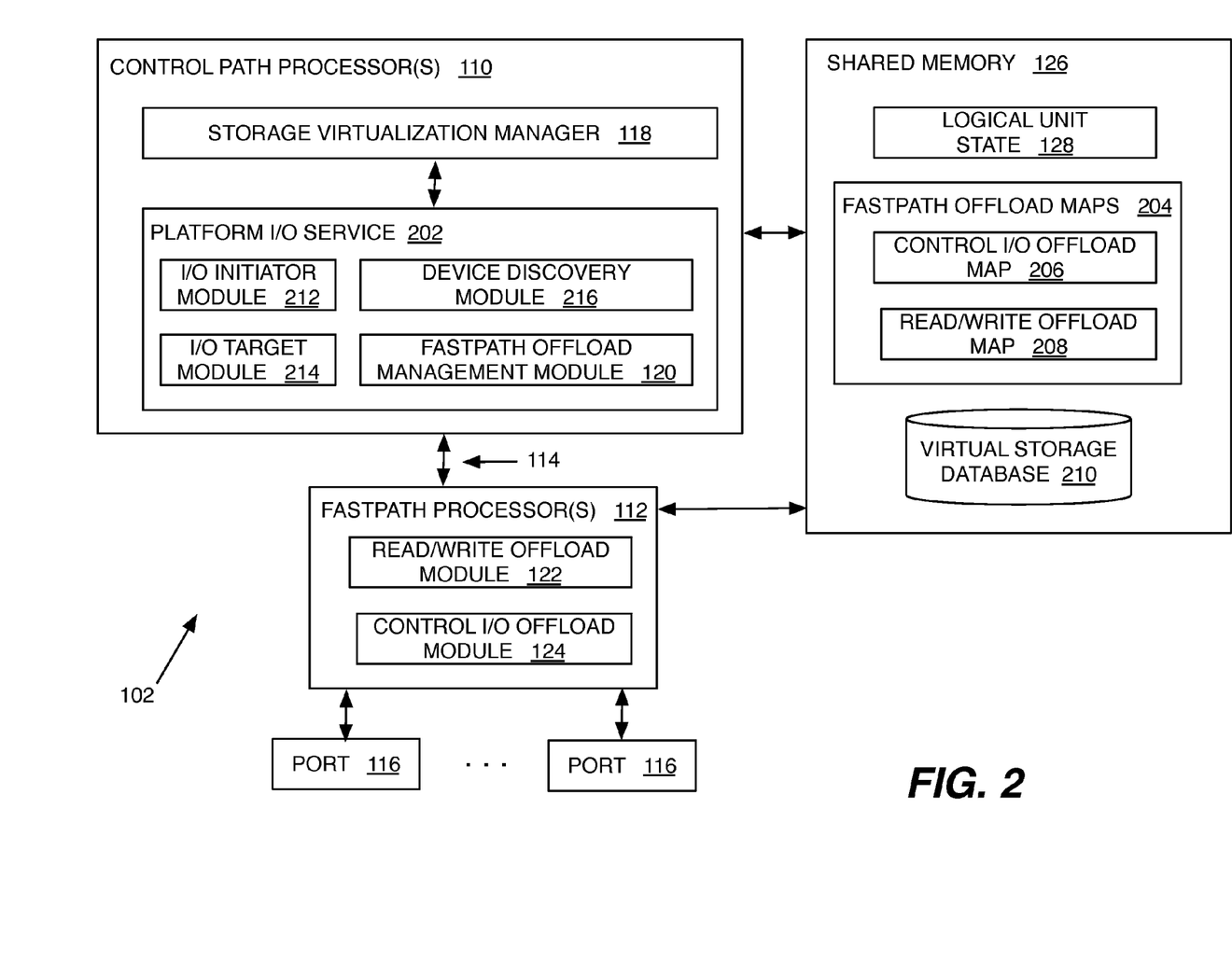
FIG. 2 is a block diagram illustrating an embodiment of the split-path storage services platform of FIG. 1.

Referring to FIG. 2, in an embodiment, the lookup operations may be facilitated via one or more tables or maps stored in the shared memory 126 (e.g., fastpath offload map(s) 204), which may be accessed by the control path processor(s) 110 and the fastpath processor(s) 112. The fastpath offload maps 204 may comprise a control I/O offload map 206 and a read/write offload map 208. As described below in more detail, the control I/O offload map 206 generally comprises data for mapping a particular control I/O command to an associated response to the control I/O command. The read/write offload map 208 generally comprises data for mapping logical state information to corresponding physical storage information. It should be appreciated that the offload maps 204 may include additional types of data for facilitating the respective lookup operations and may support any desirable data format and structure.

In the embodiment illustrated in FIG. 2, the control path processor(s) 110 may include a software subsystem (e.g., platform I/O service 202) that comprises modules for implementing various aspects of storage services. In an embodiment, the platform I/O service 202 comprises an I/O initiator module 212, an I/O target module 214, a device discovery module 216, and the fastpath offload management module 120 described above. The fastpath offload management module 120 generally comprises the functionality for configuring and controlling the offloading of read/write operations and/or certain control operations to the fastpath processor(s) 112. The I/O target module 214 generally comprises the functionality for presenting a virtual disk (e.g., virtual storage database 210—FIG. 2) to the hosts 104. As known in the art, the virtual disk is presented to the hosts 104 via logical state information. In an embodiment, the virtual disk is exposed via an ITL nexus. The ITL nexus is an addressing scheme defined by an initiator identifier (I), a target identifier (T), and a logical unit number or LUN (L). The initiator identifier corresponds to a port name of the initiator of a particular command. The target identifier corresponds to a port name of a target for a particular command. The LUN comprises the number assigned to a logical unit. The LUN may support any desirable protocol. In an embodiment, the LUN may correspond to a SCSI protocol entity that may be addressed by the actual I/O operations. As known in the art, each SCSI target may provide one or more logical units, and may not perform I/O as itself, but only on behalf of a specific logical unit.

In operation, the I/O target module 214 receives I/O commands from the hosts 104. The I/O initiator module 212 generally comprises the functionality for sending I/O commands to the storage devices 106. The device discovery module 216 generally comprises the functionality for discovering the storage devices 108 and/or the hosts 104 connected to storage network 108. The device discovery module 216 determines what devices are on the storage area network and reports the information to storage applications. In this manner, the device discovery module 216 may recognize when new hosts 104 or storage devices 106 are added to the system.

Having described the general components and operation of the split-path storage services platform 102, the architecture, operation, and/or functionality of various embodiments of the offload modules 122 and 124 will be described in more detail with reference to FIGS. 3-5. It should be appreciated that the offload modules 122 and 124 comprise the logic for providing certain functions for offloading read/write operations and/or certain control I/O operations to the fastpath processor(s) 112. Although illustrated in FIG. 2 as separate modules, it should be appreciated that each module may comprise multiple modules and in certain embodiments the associated logic may be combined into one or more associated modules. In the embodiments of FIGS. 1 & 2, the modules 122 and 124 are illustrated as components of the fastpath processor(s) 112. It should be appreciated that the modules 122 and 124 (as well as any of the modules described above) may be implemented in software, hardware, firmware, or any combination thereof. In certain embodiments, the module(s) may implemented in software or firmware that is stored in a memory (e.g., shared memory 126) and/or associated components and that are executed by the fastpath processor(s) 112, the control path processor(s) 110, or any other processor(s) or suitable instruction execution system In software or firmware embodiments, the logic may be written in any suitable computer language.

One of ordinary skill in the art will appreciate that any process or method descriptions associated with the operation of the modules 122 and 124 (or any other modules associated with the split-path storage services platform 102) may represent modules, segments, logic or portions of code which include one or more executable instructions for implementing logical functions or steps in the process. It should be further appreciated that any logical functions may be executed out of order from that described, including substantially concurrently or in reverse order, depending on the functionality involved, as would be understood by those reasonably skilled in the art. Furthermore, the modules may be embodied in any computer readable medium for use by or in connection with an instruction execution system, apparatus, or device, such as a computer-based system, processor-containing system, or other system that can fetch the instructions from the instruction execution system, apparatus, or device and execute the instructions.

Figure 3:
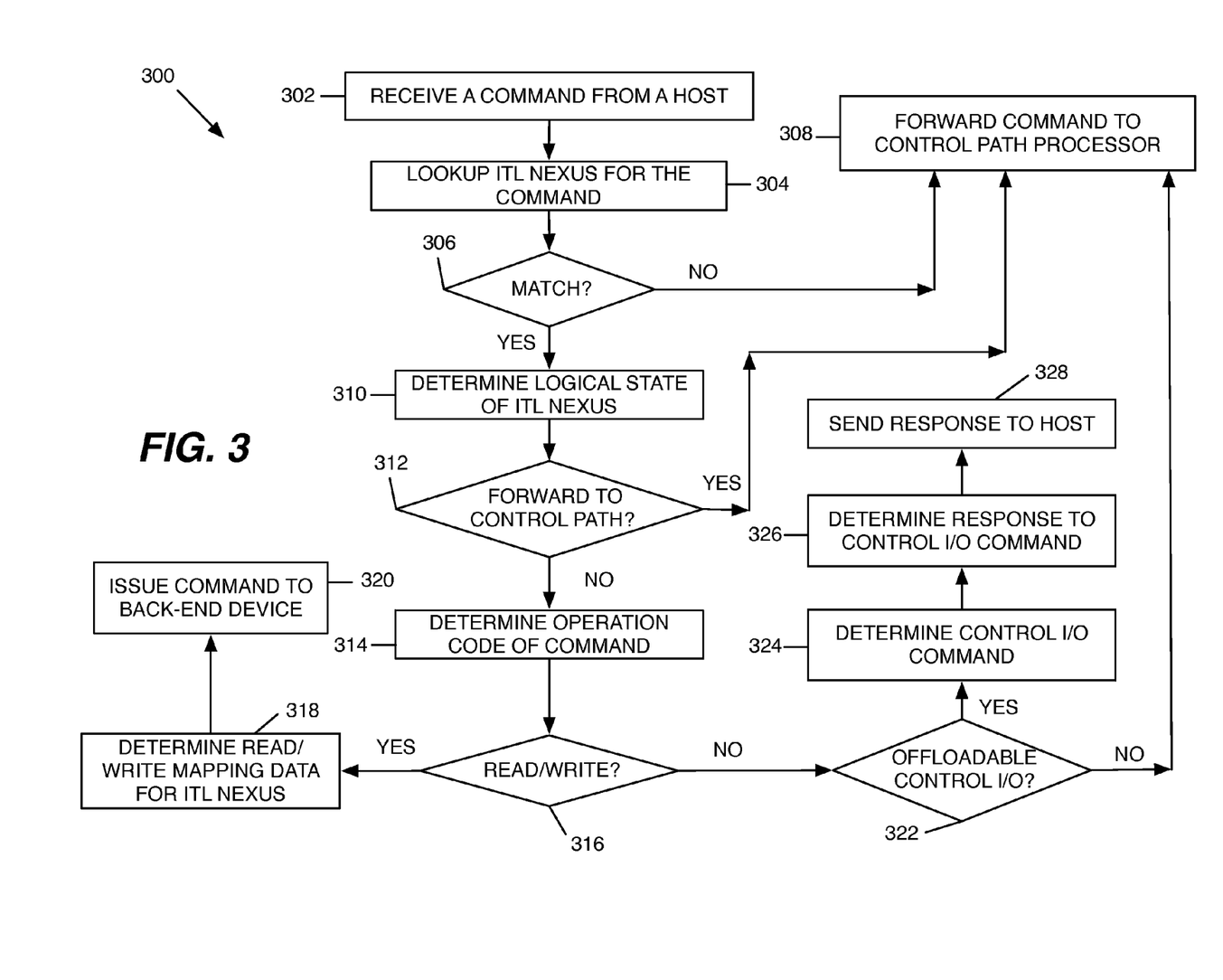
FIG. 3 is a flow chart illustrating an embodiment of a method for implementing a control I/O offload feature in the split-path storage services platform of FIGS. 1 & 2.

FIG. 3 is a flow chart illustrating an embodiment of a method 300 for implementing a control I/O offload feature in the split-path storage services platform 102 of FIGS. 1 & 2. It should be appreciated that the method 300 also represents the architecture, operation, and/or functionality of one or more aspects of the read/write module 122 and the control I/O offload module 124 (or other modules) that may implement the control I/O offload feature. At block 302, a fastpath processor 112 receives a command from a host 104 via the storage network 108. In an embodiment, the command may comprise a SCSI command, although other types of commands and protocols may be used. At block 304, the fastpath processor 112 retrieves logical state information from the received command. As mentioned above, the logical state information may include an ITL nexus. At decision block 306, the fastpath processor 112 performs a lookup to find a matching record associated with the ITL nexus. The lookup may involve accessing the shared memory 126 and information stored in, for example, the logical unit state 128, the fastpath offload maps 204 or the virtual storage database 210. In an embodiment, the fastpath processor 112 may perform a lookup in an ITL metadata table to find a matching record. If no record matches, at block 308, the command may be forwarded to a control path processor 110 for handling, and the fastpath processor 112 waits for the next command to process.

If a matching record is found, at block 310, the fastpath processor 112 may determine the state of the ITL nexus based on the information contained in the shared memory 126. At decision block 312, the fastpath processor 112 determines based at least in part on the state information (or other information) whether the command is to be handled by the control path processor 110. If the information indicates that the command is to be handled by the control processor, the fastpath processor 112 forwards the command to the control path processor 110 (block 308) and waits for the next command. If the command is not to be handled by the control path processor 110, at block 314, the fastpath processor 112 determines the particular type of operation associated with the command. In an embodiment, the fastpath processor 112 may check the SCSI operation code of the command. It should be appreciated that various types and forms of operation and other codes may be used as desired to enable the fastpath processor 112 to determine the particular operation associated with the received command.

As shown at decision blocks 316 and 322, in an embodiment, the fastpath processor 112 determines whether the received command involves, for example, a read or write operation (decision block 316) or an offloadable control I/O operation (decision block 322). Offloadable control I/O operations are those to be offloaded from the control path processor(s) 110 to the fastpath processor(s) 112. If the command involves a read or write operation, at block 318, the fastpath processor 112 determines read/write mapping data for the ITL nexus. The fastpath processor 112 may determine the mapping data based on lookups performed against, for example, the fastpath offload maps 204. In an embodiment, the fastpath processor 112 may use I/O mapping metadata for the ITL nexus to issue one or more read or write commands to storage devices 108 (block 320). Referring to decision block 322, if the command does not involve a read or write command, the fastpath processor 112 determines whether the command involves a control I/O command that is to be offloaded from the control path processor 110 to the fastpath processor 112. If the control I/O command is not to be offloaded, the fastpath processor 112 forwards the command to the control path processor 110 for handling (block 308). If the control I/O command is to be offloaded, at blocks 324 and 326, the fastpath processor 112 determines the particular control I/O command and a corresponding response to the command. As mentioned above, this information may be obtained via lookups to information contained in mapping metadata stored in the shared memory 128 (e.g., fastpath offload maps 204). At block 328, the fastpath processor 112 sends the appropriate response to the host 104 that send the command.

It should be appreciated that the mapping data may be implemented in any suitable manner using, for example, metadata, tables, or other desirable data structures. FIG. 4 illustrates an embodiment of a data structure for supporting the control I/O offload feature in a SCSI environment and implementing the fastpath offload maps 204. In this embodiment, the ITL metadata structure for implementing the control I/O offload feature is implemented as an array. It should be appreciated, however, that alternative structures, data types, fields, etc. may be employed as desired. In general, the embodiment illustrated in FIG. 4 comprises a table 400 containing a plurality of metadata records 402. Each metadata record 402 stores information associated with, for example, the ITL nexus presented by the split-path storage services platform 102 to host SCSI initiator ports. Each record 402 comprises an initiator port identifier, a target port identifier, and a LUN identifier. Records 402 may also include other information such as, for example, the state of the ITL nexus and a handle (e.g., root_mapping_object in FIG. 4) identifying the root of a data structure describing the I/O mapping metadata for the SCSI logical unit.

Figure 4:
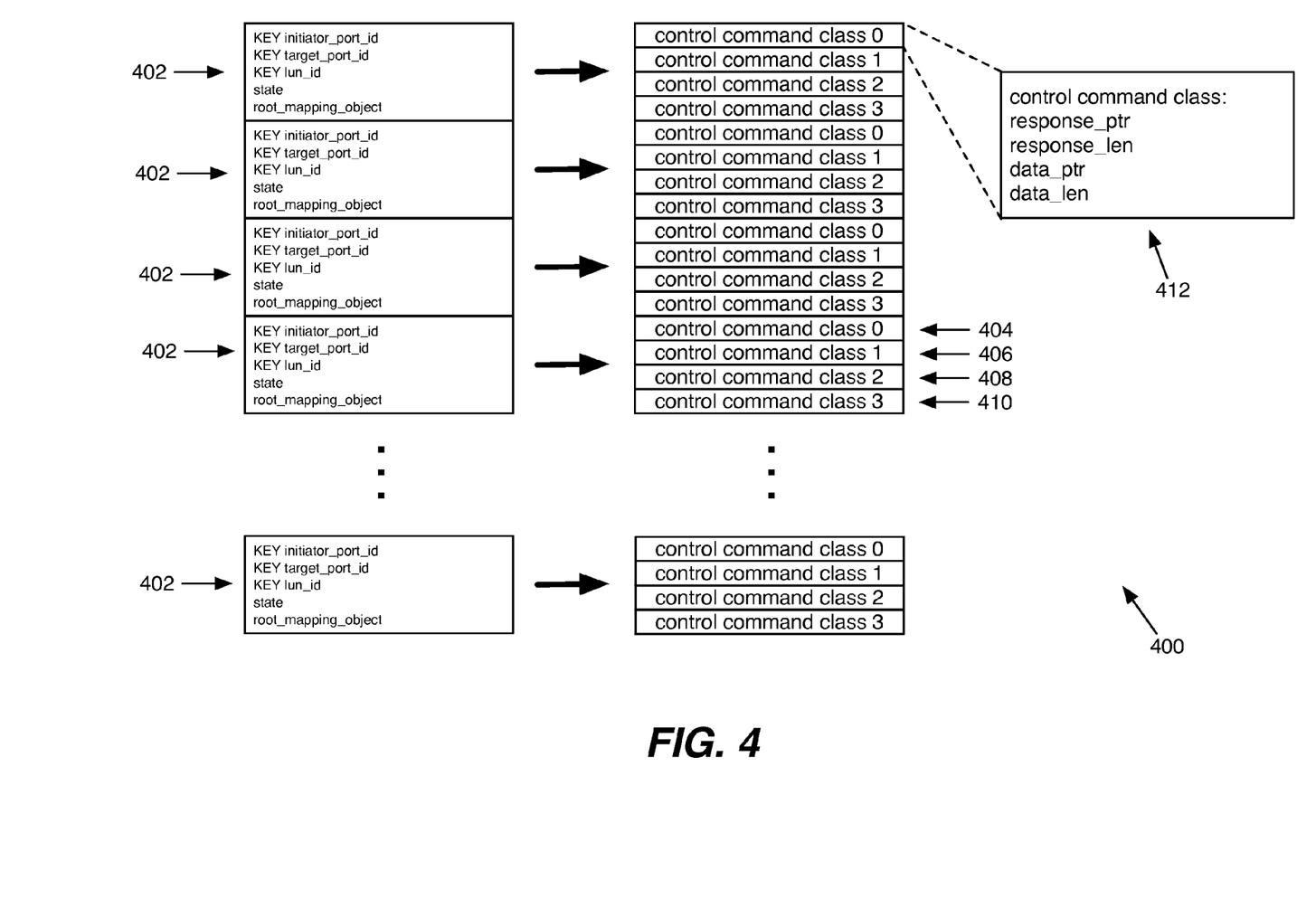
FIG. 4 is a data diagram illustrating an embodiment of a data structure for supporting the control I/O offload feature in a Small Computer System Interface (SCSI) environment.

As further illustrated in FIG. 4, to enable the control I/O offload feature described above, each metadata record 402 has one or more associated records. In an embodiment, the associated records may be structured as set of one or more control command class records 404, 406, 408 and 410. Each control command class record corresponds to a particular type of control command and includes data for describing a response to the control command. For example, as illustrated by breakout box 412, each record may comprise one or more of the following fields (or other field):

Response pointer—This field points to the data to be sent as a SCSI response for a command matching this class. If the response pointer is invalid (e.g., NULL), then the fastpath processor 112 may forward commands matching this class to the control path processor 110.

Response length—This field describes the length of the SCSI response in bytes.

Data pointer—This field points to the data to be sent as SCSI data for a command matching this class. If the data pointer is invalid (NULL), then the fastpath processor 110 may not transfer SCSI data for the command.

Data length—This field describes the length of the SCSI data in bytes.

Figure 5A:
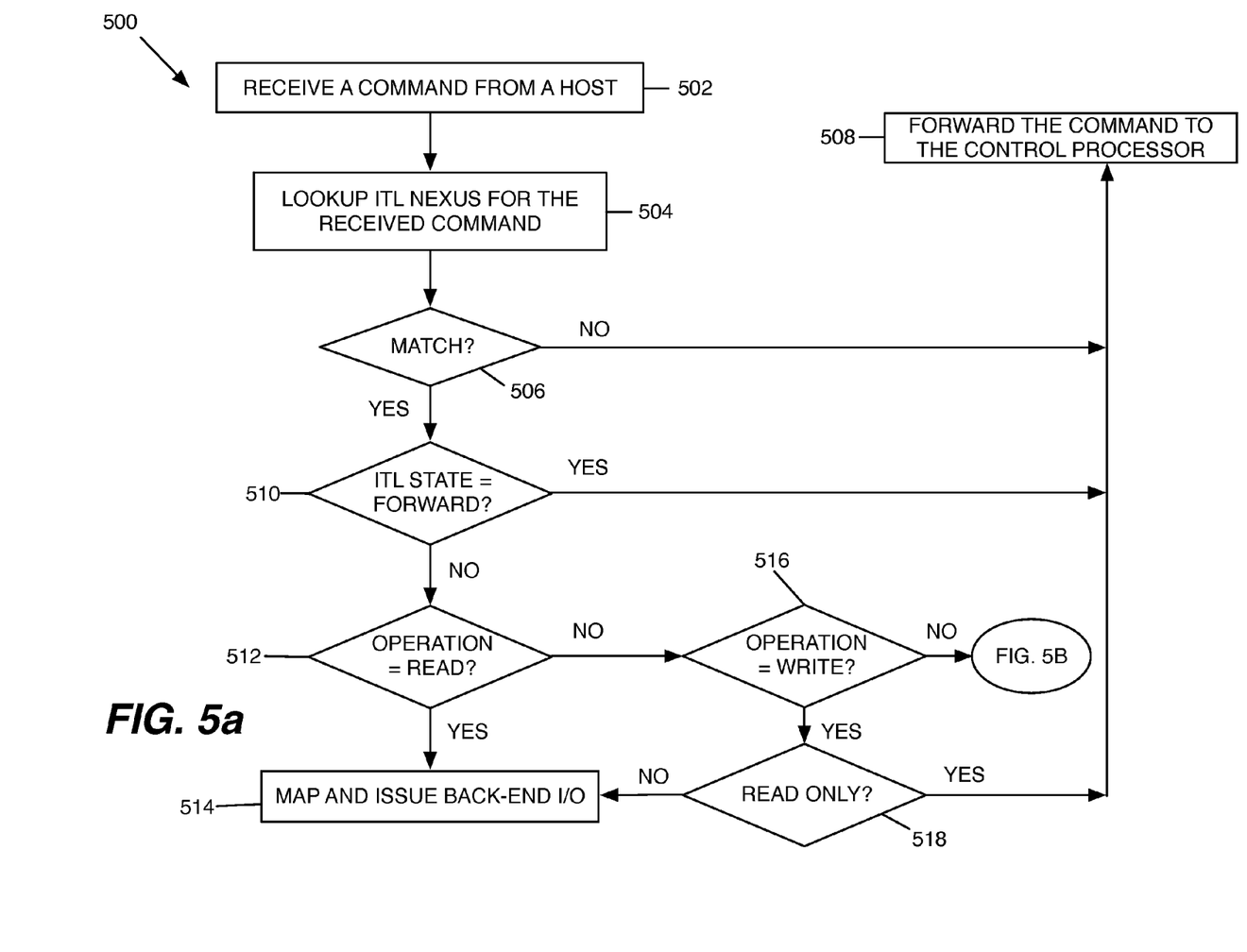
FIGS. 5a & 5b are flow charts illustrating another embodiment of a method for implementing the control I/O offload feature in the split-path storage services platform of FIGS. 1 & 2.
Figure 5B:
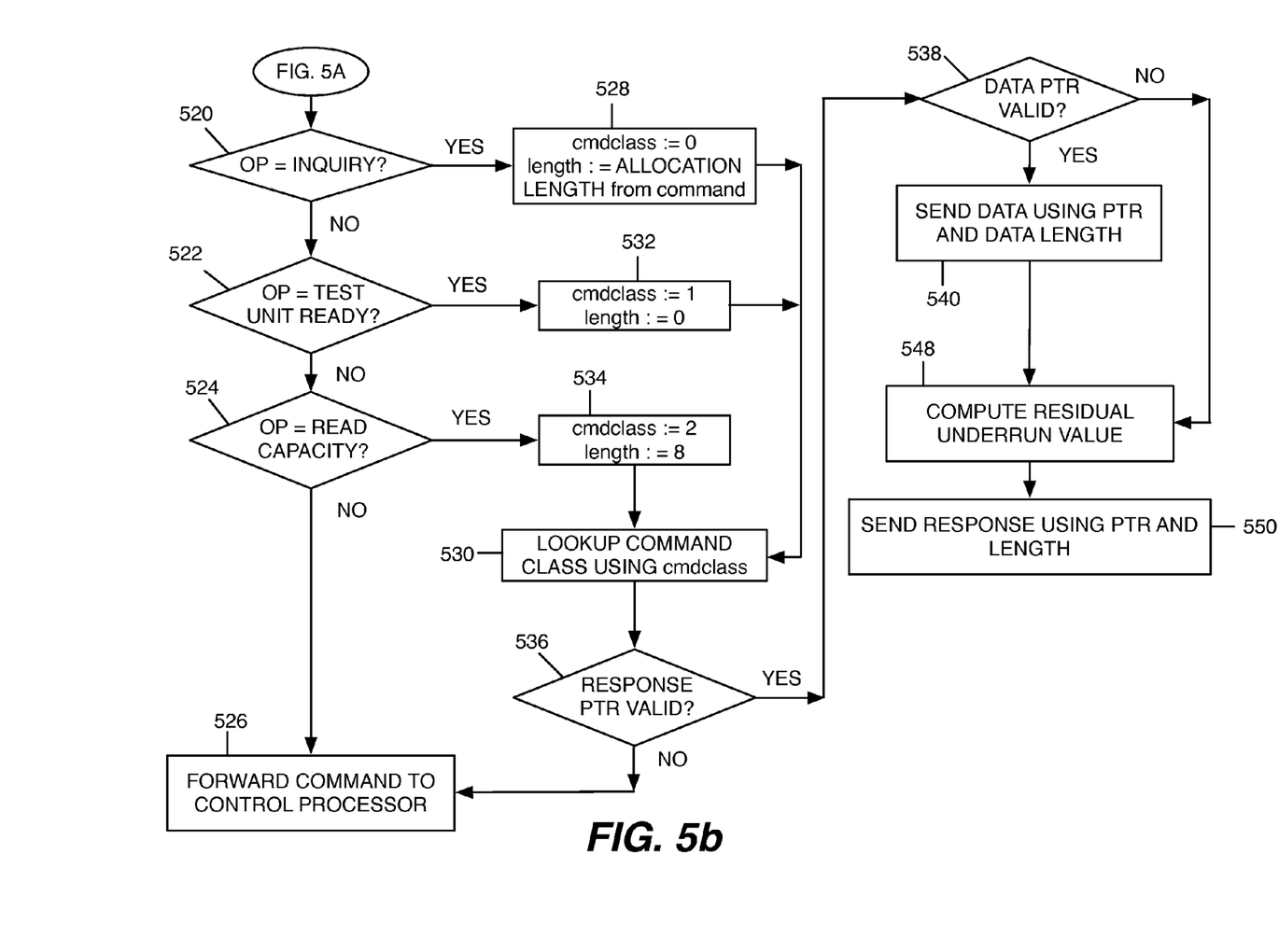

FIGS. 5a & 5b illustrate an alternative embodiment of a method 500 for implementing a control I/O offload feature. In this embodiment, three commonly issued control commands are offloaded to the fastpath processor(s) 112: standard INQUIRY (command class 0); TEST UNIT READY (command class 1); and READ CAPACITY (command class 2). One of ordinary skill in the art will appreciate that the systems and methods described provide a mechanism for selectively controlling which control commands or types of control commands are to be offloaded. In terms of configuring the system, the command class entries for an ITL may initially be cleared such that the response data pointer is NULL, and all control I/O commands are forwarded to the control processor. When a storage application (e.g., storage virtualization manager 118) running on the control path processor 110 desires to offload the processing for a standard INQUIRY, it initializes buffers for the SCSI data and response to the desired data. The application then configures the response length and data length fields for command class 0. The application may configure the data pointer field for command class 0 to point to the response buffer, and configure the response pointer field for command class 0 to point to the response buffer. To change the SCSI response or data for a command class, the storage application may set the response pointer field for the command class to NULL, causing commands to be forwarded to the control path processor 110, while the application changes settings for the command class. By causing the response pointer value to be written to memory before the storage application proceeds, consistent access by the fastpath processor(s) 112 to the fields of a command class is ensured without resorting to inefficient locking schemes. Alternate embodiments may implement alternate schemes for command classification and alternate command class collection implementations, such as, for example, a scheme that generates a hash or other key from command fields such as operation code and page codes, and uses the hash to locate a command class record.

FIGS. 5a & 5b are flow charts illustrating another embodiment of a method 500 for implementing the control I/O offload feature in the split-path storage services platform of FIGS. 1 & 2. The method 500 is employed in a SCSI environment using the command class mechanisms described above. At block 502, the fastpath processor 112 receives a SCSI command from a host 104 via the storage network 108. At block 504, the fastpath processor 112 looks up the ITL nexus for the received SCSI command in the table 400 (FIG. 4). If no record matches, at block 508, the SCSI command may be forwarded to a control path processor 110 for handling, and the fastpath processor 112 waits for the next command to process.

If a matching record is found, at decision block 510, the fastpath processor 112 may determine whether the ITL state=forward, in which case the SCSI command may be forwarded to the control path processor 110. At decision block 512, the fastpath processor 112 determines whether the operation code specifies a read operation. If the SCSI command involves a read operation, at decision block 514, the fastpath processor 112 determines the read mapping data for the ITL nexus and issues the backend I/O. If the SCSI command does not involve a read operation, at decision block 516, the fastpath processor 112 determines whether the operation code specifies a write operation. If the SCSI command involves a write operation and the ITL state is not "read only", as determined at decision block 518, the process proceeds to block 514, If the ITL state is "read only", the SCSI command may be forwarded to the control path processor 110. Referring to decision block 516, if the SCSI command does not involve a write operation, the process proceeds to decision blocks 520, 522 and 524 to determine the type of control I/O command. At decision block 520, the fastpath processor 112 determines if the operation code=INQUIRY. Decision block 522 determines if the operation code=TEST UNIT READY, and decision block 524 determines if the operation code=READ CAPACITY.

If the SCSI command involves none of the defined control I/O commands based on the control classes, the fastpath processor 112 may forward the SCSI command to the control path processor 110. Otherwise, the fastpath processor 112, as shown in block 526, initiates the control I/O offload process by determining the offload class for the command and a tentative data buffer length to use for transferring data to the initiator. At block 528, the fastpath processor 112 prepares for an INQUIRY command by assigning a command class of 0 and setting the tentative data buffer length to the value of the ALLOCATION LENGTH parameter in the SCSI command data block (CDB) for the command. At block 532, the fastpath processor 112 prepares for a TEST UNIT READY command by assigning a command class of 1 and setting the tentative data buffer length to zero. At block 534, the fastpath processor 112 prepares for a READ CAPACITY command by assigning a command class of 2 and setting the tentative data buffer length to 8.

At block 530, the fastpath processor 112 then uses the command class to look up the metadata block 402 associated with the command class. At block 536, the fastpath processor 112 tests the value of the response pointer for the command class. If the value is invalid (a NULL value), the fastpath processor 112 forwards the SCSI command to the control processor, as shown in block 526. Otherwise, at block 538, the fastpath processor 112 tests the value of the data pointer for the command class.

If the value of the data pointer is valid, at block 540, the fastpath processor 112 computes the final data buffer length as the minimum of the data buffer length and the data_len value from the metadata entry. The fastpath processor 112 then allocates a data buffer with a length in bytes equal to the final data buffer length, and copies this many bytes from the location referenced by the data pointer to the data buffer. The fastpath processor 112 then transfers the contents of the data buffer over the SAN to the initiator.

At block 548, the fastpath processor 112 computes a residual underrun value as the maximum of zero and the difference between the initial data transfer buffer length and the data_len value. In block 550, the fastpath processor 112 allocates a response buffer with length equal to the resp_len value from the metadata entry, and copies this many bytes from the location referenced by the data pointer to the response buffer. If the residual underrun value computed in block 548 is greater than zero, the fastpath processor 112 sets the residual underrun information in the response according to the SAN-specific protocol definition for the SCSI response. In an embodiment, for a Fibre Channel SAN, a residual underrun may be indicated by setting the FCP_RESID_UNDER flag in the response, and setting the FCP_RESID parameter to the value determined in block 548. The fastpath processor 112 then transfers the contents of the response buffer over the SAN to the initiator, completing the processing of the control command.

It should be noted that this disclosure has been presented with reference to one or more exemplary or described embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. A computer system for providing split-path storage services, the computer system comprising:
    a fastpath processor adapted to communicate with a plurality of hosts and a plurality of storage devices via a storage area network;
    a control path processor for processing at least commands involving control I/O operations, the control path processor being in communication with the fastpath processor;
    a shared memory accessible by the control path processor and the fastpath processor, the shared memory storing logical state information associated with the hosts and the storage devices and mapping information for determining whether commands received by the fastpath processor are to be handled by the fastpath processor or the control path processor; and
    a command offload module executable by the fastpath processor, the command offload module comprising logic configured to: receive, at the fastpath processor, a command from one of the hosts via the storage area network;
    retrieve logical state information associated with the command; based on the mapping information, determine whether the received command involves a read/write operation or an offloaded control I/O operation, wherein the read/write operation involves a transfer of data stored or to be stored on at least one of the plurality of storage devices and the offloaded control I/O operation involves a request for information about logical state of the data offloaded to the fastpath processor;
    when the received command involves a read/write operation, determining read/write mapping data based on the mapping information and issuing a read/write command to the corresponding storage device;

when the received command involves an offloaded control I/O operation, determining a response to the received command based on the mapping information and sending the response to the host.

2. The computer system of claim 1, further comprising a fastpath offload management module executable by one of the control path processor and the fastpath processor, the fastpath offload management module comprising logic configured to selectively control which type of control I/O operations are to be offloaded to the fastpath processor.

3. The computer system of claim 1, wherein the offloaded control I/O operations comprise one or more of the following SCSI operations; an inquiry control command; a test unit ready control command; and a read capacity control command.

4. The computer system of claim 1, wherein the received command comprises a SCSI command.

5. The computer system of claim 1, wherein the logical state information comprises an ITL nexus.

6. The computer system of claim 1, wherein the fastpath processor comprises one or more embedded processors.

7. A method for providing split-path storage services to a plurality of hosts via a storage area network, the method comprising:
receiving, at a fastpath processor, a command from a host via a storage area network;
retrieving logical state information associated with the received command; based on stored mapping information, determining whether the received command involves a read/write operation or an offloaded control I/O operation;
when the received command involves a read/write operation, handling the read/write operation with the fastpath processor by determining read/write mapping data based on the mapping information and issuing a read/write command to the corresponding storage device;
when the received command involves an offloaded control I/O operation, handling the offloaded control I/O operation with the fastpath processor by determining a response to the received command based on the mapping information and sending the response to the host; and
when the received command does not involve a read/write operation or an offloaded control I/O operation, forwarding the received command to a control path processor configured for processing at least commands involving control I/O operations, wherein the read/write operation involves a transfer of data stored or to be stored on at least one of the plurality of storage devices and the offloaded control I/O operation involves a request for information about logical state of the data offloaded to the fastpath processor.

8. The method of claim 7, further comprising selectively controlling which type of control I/O operations are to be offloaded to the fastpath processor.

9. The method of claim 8, wherein the offloaded control I/O operations comprise one or more of the following SCSI operations: an inquiry control command; a test unit ready control command; and a read capacity control command.

10. The method of claim 7, wherein the received command comprises a SCSI command.

11. The method of claim 7, wherein the retrieving logical state information comprises identifying an ITL nexus associated with the received command.

12. A computer program embodied in a computer-readable medium and executable by a processor, the computer program for providing split-path storage services, the computer program comprising logic configured to:
receive, at a fastpath processor, a command from a host via a storage area network;
retrieve logical state information associated with the received command;
based on stored mapping information, determine whether the received command involves a read/write operation or an offloaded control I/O operation;
when the received command involves a read/write operation, process the read/write operation with the fastpath processor by determining read/write mapping data based on the mapping information and issuing a read/write command to a corresponding storage device connected to the storage area network;
when the received command involves an offloaded control I/O operation, process the offloaded control I/O operation with the fastpath processor by determining a response to the received command based on the mapping information and sending the response to the host; and
when the received command does not involve a read/write operation or an offloaded control I/O operation, forward the received command to a control path processor configured for processing at least commands involving control I/O operations, wherein the read/write operation involves a transfer of data stored or to be stored on at least one of the plurality of storage devices and the offloaded control I/O operation involves a request for information about logical state of the data offloaded to the fastpath processor.

13. The computer program of claim 12, further comprising logic configured to control which type of control I/O operations are to be offloaded to the fastpath processor.

14. The computer program of claim 12, wherein the offloaded control I/O operations comprise one or more of the following SCSI operations: an inquiry control command; a test unit ready control command; and a read capacity control command.

15. The computer program of claim 12, wherein the received command comprises a SCSI command.

16. The computer program of claim 12, wherein the logic configured to retrieve logical state information comprises logic configured to identify an ITL nexus associated with the received command.

* * * * *